(12) United States Patent
Xiong et al.

(10) Patent No.: US 10,313,150 B2
(45) Date of Patent: Jun. 4, 2019

(54) DATA TRANSMISSION METHOD AND DEVICE FOR ROBOT USING BUFFER

(71) Applicant: UBTECH Robotics Corp., Shenzhen (CN)

(72) Inventors: Youjun Xiong, Shenzhen (CN); Hailang Zhou, Shenzhen (CN); Musen Zhang, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 0 days.

(21) Appl. No.: 15/669,961

(22) Filed: Aug. 7, 2017

(65) Prior Publication Data

US 2018/0191524 A1     Jul. 5, 2018

(30) Foreign Application Priority Data

Dec. 30, 2016   (CN) .......................... 2016 1 1253294

(51) Int. Cl.
*H04L 12/40*     (2006.01)
*H04L 29/06*     (2006.01)

(52) U.S. Cl.
CPC .. *H04L 12/40071* (2013.01); *H04L 12/40006* (2013.01); *H04L 12/40019* (2013.01); *H04L 29/0602* (2013.01); *H04L 2012/40215* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,715,001 | B1 * | 3/2004 | Birns | G06F 15/78 709/203 |
| 6,845,416 | B1 * | 1/2005 | Chasmawala | H04L 12/4135 710/107 |
| 7,370,124 | B2 * | 5/2008 | Umlauf | G06F 15/167 709/238 |
| 2009/0185215 | A1 * | 7/2009 | Kreppold | G06F 12/0661 358/1.15 |
| 2013/0282946 | A1 * | 10/2013 | Ricci | G06F 13/4004 710/306 |
| 2016/0219413 | A1 * | 7/2016 | Mabuchi | H04W 4/046 |

* cited by examiner

*Primary Examiner* — Raymond N Phan (57) ABSTRACT

The present disclosure relates to a data transmission method for robot, including: transmitting an attribute reporting request to at least one node via an attribute request frame, receiving an attribute reporting response transmitted from the node, updating the length of a buffer according to the attribute reporting response when a length of at least one attribute to be reported being determined to be greater than the length of the buffer. The attribute reporting response carries the length of the attribute data, and receiving the attribute data reported from the node via at least one block data, when the length of the attribute to be reported being determined to be less than or equals to the length of the buffer.

20 Claims, 6 Drawing Sheets

DATA TRANSMISSION METHOD AND DEVICE FOR ROBOT USING BUFFER

CROSS REFERENCE TO RELATED APPLICATIONS

This application claims priority to Chinese Patent Application No. 201611253294.4, filed Dec. 30, 2016, which is hereby incorporated by reference herein in its entirety.

BACKGROUND

1. Technical Field

The present disclosure relates to communication field, and particularly to a data transmission method for robot using buffer and a data transmission device for robot using buffer.

2. Description of Related Art

Controller Area Network (CAN) bus is a serial communication protocol for real-time applications, and is a point-to-multipoint mechanism. The CAN has been adopted in a variety of industries, such as, textile machinery, agricultural machinery, robots, CNC machine tools, medical equipment and sensors.

The demanding of the reliability with respect to the data-processing and the communication system has become higher, as the complexity of the device, the harshness of application environment, and the complexity of the system, tasks have been increased. Therefore, it is necessary to improve the communication process of the CAN bus protocol.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

A data transmission method and a device for robot in the present disclosure are based on a controller area network (CAN) bus. A main controller in the device is configured to be a control center to control each node within the device. The main controller may transmit broadcast messages to each of the nodes via a broadcast channel and may respectively configure a channel for each of the nodes. As such, the main controller may communicate with the respective node via the channel, and the device may achieve a variety of functions under different application scenarios, wherein the nodes may correspond to different elements under the different application scenarios. For example, a robot, the node may include joint servo steering gear, drive wheel, sensor, and dot matrix display.

The present disclosure relates to a data frame including a standard data frame and an extended data frame, wherein the standard data frame and the extended data frame are configured to improve the conventional standard data frame and the conventional extended data frame within the CAN bus 2.0B.

In the CAN bus 2.0B, the data frame may include a plurality of fields, including a frame start, an arbitration field, a control field, a data field, a cyclic redundancy check (CRC) field, a response field, and a frame end. Wherein the arbitration field may include an identity (ID) sub-field and other flags. The ID sub-field carries the identity of the node, wherein the identity of the node is configured to indicate the different nodes. The main difference between the standard data frame and the extended data frame resides in that the number of bits of the ID sub-field of the arbitration field is different. The number of bits of the ID sub-field of the arbitration field in the standard data frame is 11, and the number of bit of the ID sub-field of the arbitration field in the extended data frame is 29.

The data frame of the present disclosure is configured to improve the ID sub-field and data field of the arbitration field. However, only the enhancement will be described below.

1. The Standard Data Frame in the Present Disclosure.

1.1 The ID Sub-Field of the Arbitration Field.

The difference between the conventional CAN bus 2.0B and the standard data frame in present disclosure is illustrated in Table 1.

In one embodiment, the standard data, frame includes a frame-mode indication sub-field and a channel identification field.

The frame-mode indication sub-field includes 2 bits, including M1 and M0, wherein the frame-mode indication sub-field is configured to indicate an analytical method of the frame.

The channel identification field includes 9 bits, including by CH8 to CH0, wherein the channel identification field is configured to indicate the identity of the channel between the main controller and the node. The value of the channel in the standard data frame is in a range from 0 to 511. When the value of the channel identification field is zero, it is determined that the channel is a broadcast channel, wherein each of the nodes may receive messages transmitted from the main controller via the broadcast channel.

TABLE 1

| CAN bus 2.0B | ID sub-field (11 bits) | | | | | | | | | | |
|---|---|---|---|---|---|---|---|---|---|---|---|
| | ID10 | ID9 | ID8 | ID7 | ID6 | ID5 | ID4 | ID3 | ID2 | ID1 | ID0 |
| Examples | M1 | M2 | CH8 | CH7 | CH6 | CH5 | CH4 | CH3 | CH2 | CH1 | CH0 |

The difference between the conventional CAN bus 2.0B and the extended data frame in present disclosure is illustrated in Table 2.

The extended data frame in the present disclosure includes the frame-mode indication sub-field, the channel identification field, and a flag field.

The frame-mode indication sub-field includes 3 bits, including M1, M0, and EM0, wherein the frame-mode indication sub-field is configured to indicate the analytical method of the frame.

The flag field includes 10 bits. N indicates a reserved bit, END is configured to indicate the last frame. For example, if the value of the END equals to zero, it is determined that the frame is not the last frame. If the value of the END equals to 1, the frame is configured to be the last frame. "I" is a self-increasing cycle code configured to indicate a sending serial number of the frame.

The channel identification field includes 16 bits illustrating by CH15 to CH0, wherein the channel identification field is configured to indicate the channel between the main controller and the node. The value of the channel identification field in the extended data frame is in a range from 0 to 65535. The zero value indicates the broadcast channel, wherein each of the nodes may receive messages transmitted from the main controller via the broadcast channel.

TABLE 2

| CAN bus 2.0B | ID sub-field (29 bits) | | | | | | | | | | | | |
|---|---|---|---|---|---|---|---|---|---|---|---|---|---|
| | ID10 | ID9 | ID8 | ID7 | ID6 | ID5 | ... | ID0 | EID17 | EID16 | EID15 | ... | EID0 |
| Example | M1 | M2 | EM0 | N | END | 17 | ... | 12 | 11 | 10 | CH15 | ... | CH0 |

An example of the frame-mode indication sub-field of the present disclosure is shown in Table 3. It is note that the different values of the frame-mode indication sub-field may indicate different analytical methods of the frame, wherein the different analytical method are configured to different application scenarios.

| M1 | M0 | EM0 | Description | Remarks |
|---|---|---|---|---|
| 0 | 0 | 0 | Node controlling instruction frame | Adopting the standard data frame if the identity of the channel corresponding to the node is less than 512, so as to improve the efficiency of the bus |
| 0 | 1 | 0 | Node return instruction frame | |
| 0 | 0 | 1 | Upload node string code | Adopting the extended data frame to transmit data |
| 0 | 1 | 1 | Frame for configuring the channel of the node | |
| 1 | 0 | 0 | Block control instruction frame | Adopting the extended data frame to transmit data |
| 1 | 1 | 0 | Block return instruction frame | |
| 1 | 0 | 1 | Block data outputting frame | |

-continued

| M1 | M0 | EM0 | Description | Remarks |
|---|---|---|---|---|
| 1 | 1 | 1 | Block data inputting frame | |

1.2 Data Field.

The difference between the conventional CAN bus 2.0B and the data field of the data frame in present disclosure is illustrated in Table 4.

The data field of the data frame in present disclosure may include a CMD field of 1 bit, indicating the different analytical methods of the frame. The CMD field is configured to indicate a secondary instruction, and the different values of the CMD field may represent the different secondary instructions. After the CMD field, the data field further includes 7 bits, from D0 to D6, indicating the data carried by the secondary instruction. The data fields of the block data outputting frame and the block data inputting frame respectively include eight bits which are configured to carry the data, so as to improve the transmission efficiency of the block data.

TABLE 4

| | Data field (8 bits) | | | | | | | |
|---|---|---|---|---|---|---|---|---|
| CAN bus 2.0B | D0 | D1 | D2 | D3 | D4 | D5 | D6 | D7 |
| Node controlling instruction frame | CMD | D0 | D1 | D2 | D3 | D4 | D5 | D6 |
| Node return instruction frame | CMD | D0 | D1 | D2 | D3 | D4 | D5 | D6 |
| Upload node string code | D0 | D1 | D2 | D3 | D4 | D5 | D6 | D7 |
| Frame for configuring the channel of the node | D0 | D1 | D2 | D3 | D4 | D5 | D6 | D7 |
| Block control instruction frame | CMD | D0 | D1 | D2 | D3 | D4 | D5 | D6 |
| Block return instruction frame | CMD | D0 | D1 | D2 | D3 | D4 | D5 | D6 |
| Block data outputting frame | D0 | D1 | D2 | D3 | D4 | D5 | D6 | D7 |
| Block data inputting frame | D0 | D1 | D2 | D3 | D4 | D5 | D6 | D7 |

Figure 1:
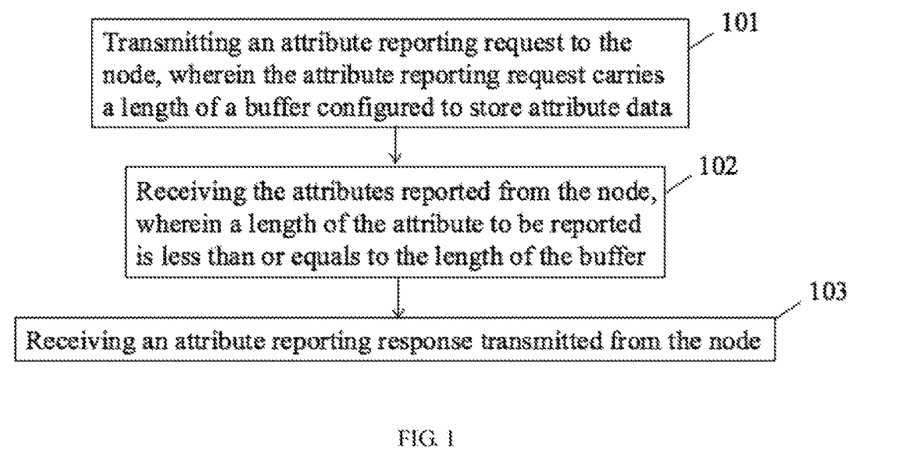
FIG. 1 is a flowchart illustrating a frame transmission method for robot in accordance with one embodiment of the present disclosure.

The present disclosure relates to a data transmission method for robot, as shown in FIG. 1. The data transmission method may be adopted by a main controller, including the following steps.

In step 101: transmitting an attribute reporting request to the node, wherein the attribute reporting request carries a length of a buffer configured to store attribute data.

In step 102: receiving the attribute data reported from the node, wherein a length of the attribute to be reported is less than or equals to the length of the buffer.

In step 103: receiving an attribute reporting response transmitted from the node.

The present disclosure relates to a data transmission method for robot, wherein the main controller may receive the attribute data reported from the node. The main controller may inform the length of the buffer for storing the attribute data, while requesting the node to report the attribute data. As such, the node is aware of the length of the buffer, so as to enhance the reliability.

Figure 2:
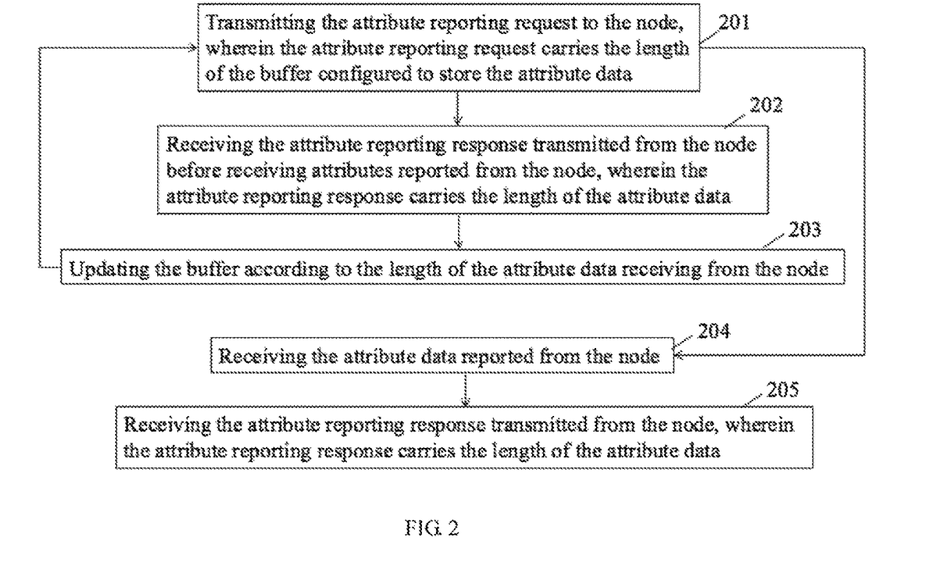
FIG. 2 is a flowchart illustrating a frame transmission method for robot in accordance with one embodiment of the present disclosure.

The present disclosure relates to the data transmission method for robot, as shown in FIG. 2. The data transmission method may be adopted by the main controller, including the following steps.

In step 201: transmitting the attribute reporting request to the node, wherein the attribute reporting request carries the length of the buffer configured to store the attribute data.

The attribute reporting request may be transmitted via an attribute request frame which is block instructions, wherein the attribute request frame adopts an extended data frame format. A value of the frame-mode indication, sub-field of the ID sub-field in the arbitration field is configured to be M1M0EM0=100. A format of the data field in the attribute request frame is illustrated in Table 5. The $0^{th}$ bit of the data field is configured to be the CMD instruction code. The value FE indicates the frame is an attribute request frame. The main controller transmits the attribute request frame to the node which indicates that the main controller requires the node to report the attribute data. The first bit to the fourth bit of the data field indicates the length of the buffer in the main controller, wherein the length of the buffer is configured to receive the attribute data reported from the node. The length of the attribute may not be greater than the length of the buffer. The attribute request frame is transmitted via a channel between the main controller and the node, wherein the channel is assigned by the main controller. If the node receives the block instruction attribute request via the broadcast channel, the block instruction attribute request is configured to be an invalid frame, and the node may ignore the block instruction attribute request.

TABLE 5

| Bit | Description | Range of value | Usage | Remarks |
| --- | --- | --- | --- | --- |
| 0 | Instruction code | 0XFE | Receiving the attribute data reported from the node, wherein a length of the attribute to be reported is less than or equals to the length of the buffer | Invalid broadcast |
| 1~4 | Length of buffer | 0~4G | Receiving the length of the attribute data of the node | No symbols |

In one example, the node may receive the attribute reporting request transmitted from the main controller, obtain the length of the buffer within the main controller configured to receive the attribute data of the node, and determine whether the length of the attribute data to be reported is greater than the length of the buffer. The node may inform the main controller to update the buffer in order to receive the attribute data before reporting the attribute data upon determining the length of the attribute data to be reported is greater than the length of the buffer. This embodiment is an example illustrating the length of the attribute data to be reported is greater than the length of the buffer.

In step 202: receiving the attribute reporting response transmitted from the node before receiving attribute data reported from the node, wherein the attribute reporting response carries the length of the attribute data.

The attribute reporting response may be received via the block instruction attribute request response frame, wherein the block instruction attribute request response frame adopts the extended data frame format. The value of the frame-mode indication sub-field of the ID sub-field in the arbitration field is configured to be M1M0EM0=110. A format of the data field in the block instruction attribute request response frame is illustrated in Table 6. The $0^{th}$ bit of the data field is configured to be the CMD instruction code. The value FD indicates the frame indicates the block instruction attribute request response frame. The node may transmit the block instruction attribute request response frame to the main controller under two circumstances. The first circumstance is that the node may transmit the block instruction attribute request response frame to the main controller after reporting the attribute data to the main controller, wherein the block instruction attribute request response frame is configured to indicate the process of transmitting the attribute data is completed. The second circumstance is the node may transmit the block instruction attribute request response frame to the main controller before reporting the attribute data to the main controller upon determining the length of the attribute data to be reported is greater than the length of the buffer of the main controller, wherein the block instruction attribute request response frame is configured to inform the main controller to update the buffer. The first bit to the fourth bit of the data field is configured to be the length of the attribute data. The block instruction attribute request response frame is transmitted via the channel between the main controller and the node, wherein the channel is assigned by the main controller. If the main controller receives the block instruction attribute request response frame via the broadcast channel, the block instruction attribute request response frame is configured to be an invalid frame, and the main controller may ignore the block instruction attribute request response frame.

TABLE 6

| Bit | Description | Range of value | Usage | Remarks |
| --- | --- | --- | --- | --- |
| 0 | Instruction code | 0XFD | Transmitting the attribute data to the main controller before responding block attribute instruction request frame; returning the frame and inform the main controller to update the buffer, and to re-transmit, the block attribute instruction request frame upon determining the length of the attribute to be reported is greater than the | Invalid broadcast |

TABLE 6-continued

| Bit | Description | Range of value | Usage | Remarks |
|---|---|---|---|---|
| 1~4 | Length of attribute | 0~4G | length of the buffer of the main controller Length of attribute | No symbols |

In step 203: updating the buffer according to the length of the attribute data receiving from the node, and re-conducting the step 201.

The main controller receives the attribute reporting response, and the main controller may update the buffer according to the length of the attribute to be reported, wherein the length of the attribute is carried by the attribute reporting response.

In step 204: receiving the attribute data reported from the node.

The main controller may receive the attribute data reported from the node by receiving at least one block data transmitted from the node. The block data is transmitted via the block data inputting frame, wherein the block data inputting frame adopts the extended data frame format. The value of the frame-mode indication, sub-field of the ID sub-field in the arbitration field is configured to be M1M0EM0=111. The "I" of the ID sub-field of the arbitration field indicates a sending serial number of the frame, i.e., the "I" indicates the number of the data block that has been transmitted, and "I" may be refer to as a data block indicator. The END indicates a last frame. The data field of the block data inputting frame may not include the CMD field, and the $0^{th}$ bit to the seventh bit may be configured to be the data bit.

In one example, the attribute data of the node adopt an "ini" configuration file format, including: a constant, portion and a variable portion. Elements within the constant portion may not be changed, wherein the elements within the constant portion may include: a production identity an upgrade indicator, and a secondary instruction to be used. Elements within the constant portion may be changed, such as a node identity (ID). The attribute of the node may be transform into a data format which may be carried by the block data inputting frame via coding.

In step 205: receiving the attribute reporting response transmitted from the node, wherein the attribute reporting response carries the length of the attribute data.

The attribute reporting response may be transmitted via the block instruction attribute request response frame. The node may inform the main controller that the attribute data have been transmitted completely by transmitting the block instruction attribute request response frame after the node completes the transmission of the attribute data.

In one example, the main controller may receive the attribute reporting response. If the length of the received attribute is less than or is greater than the length carried by the attribute reporting response, the main controller may re-conduct the step 201 to request the node to report the attribute data.

Figure 3:
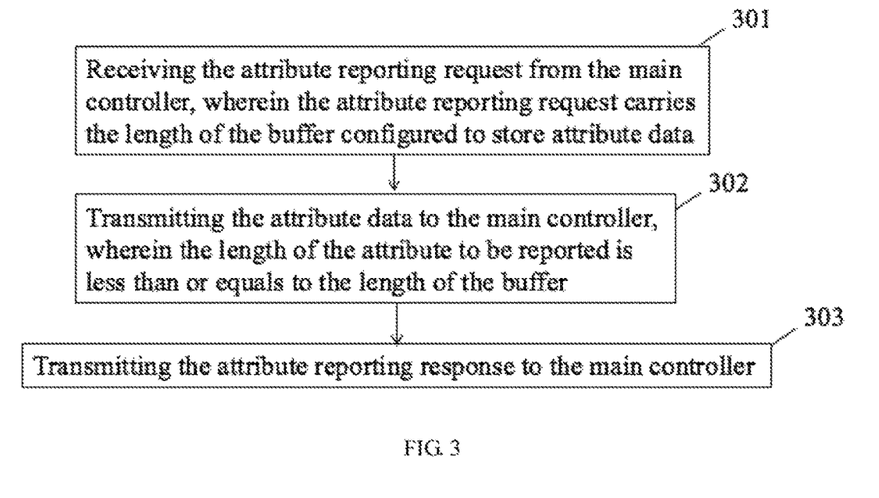
FIG. 3 is a flowchart illustrating a frame transmission method for robot in accordance with one embodiment of the present disclosure.

In another aspect, as shown in the FIG. 3, the present disclosure relates to the data transmission method for robot, including the following steps.

In step 301: receiving the attribute reporting request from the main controller, wherein the attribute reporting request carries the length of the buffer configured to store attribute data.

In step 302: transmitting the attribute data to the main controller, wherein the length of the attribute to be reported is less than or equals to the length of the buffer.

In step 303: transmitting the attribute reporting response to the main controller.

The present disclosure relates to the data transmission method for robot, wherein the node may report the attribute data to the main controller. The main controller may inform the length of the buffer, which is configured to store the attribute data, while transmitting the attribute reporting request to the node. As such, the length of the attribute to be reported may be configured to be less than the length of the buffer, so as to enhance the reliability.

Figure 4:
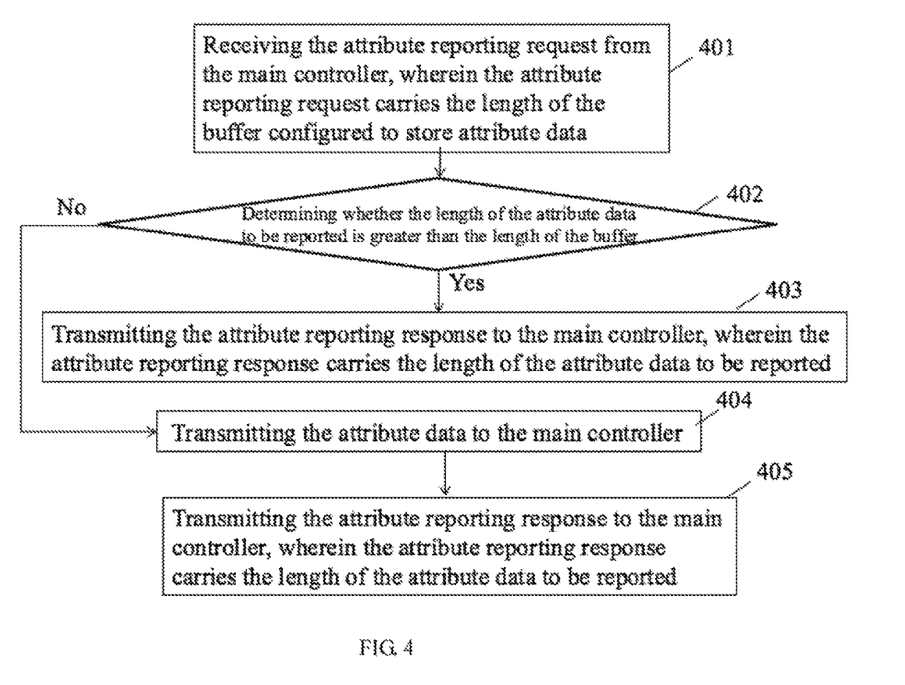
FIG. 4 is a flowchart illustrating a frame transmission method for robot in accordance with one embodiment of the present disclosure.

In another aspect, as shown in the FIG. 4, the present disclosure relates to the data transmission method for robot, including the following steps.

In step 401: receiving the attribute reporting request from the main controller, wherein the attribute reporting request carries the length of the buffer configured to store attribute data.

The attribute reporting request may be transmitted via the attribute request frame described in above.

In step 402: determining whether the length of the attribute data to be reported is greater than the length of the buffer, if the length of the attribute data to be reported is greater than the length of the buffer, the process goes to step 403, if the length of the attribute data to be reported is not greater than the length of the buffer, the process goes to step 404.

In step 403: transmitting the attribute reporting response to the main controller, wherein the attribute reporting response carries the length of the attribute data to be reported.

The attribute reporting response may be received via the block instruction attribute request response frame described in above.

The node may receive the attribute reporting request from the main controller, i.e., re-conducting the step 401, after the step 403. Wherein the length of the buffer carried by the attribute reporting request, which is transmitted by the main controller, has been updated according to the length of the attribute to be reported.

In step 404: transmitting the attribute data to the main controller.

The main controller may receive the attribute data reported from the node by receiving the at least one block data transmitted from the node. The block data is transmitted via the block data inputting frame, wherein the block data inputting frame adopts the extended data frame format. The value of the frame-mode indication sub-field of the ID sub-field in the arbitration field is configured to be M1M0EM0=111. The "1" of the ID sub-field of the arbitration field indicates a sending serial number of the frame, i.e., the "1" indicates the number of the data block that has been transmitted, and "1" may be refer to as a data block indicator. The END indicates a last frame. The data field of the block data inputting frame may not include the CMD add, and the $0^{th}$ bit to the seventh bit may be configured to be the data bit.

In one example, the attribute data of the node adopt the "ini" configuration file format, including: the constant portion and the variable portion. The elements within the constant portion may not be changed, wherein the elements may include: the production identity, the upgrade indicator, and the secondary instruction to be used. The elements within the constant portion may be changed, such as the node identity (ID). The attribute of the node may be transform into the data format which may be carried by the block data inputting frame via coding.

In step 405: transmitting the attribute reporting response to the main controller, wherein the attribute reporting response carries the length of the attribute data to be reported.

The attribute reporting response may be transmitted via the block instruction attribute request response frame described in above. The node may inform the main controller that the attribute data have been transmitted completely by transmitting the block instruction attribute request response frame after the node completes the transmission of the attribute data.

The following description is an example of the data transmission method applied to application scenario.

The channel between the main controller and the node is assumed to be 10 (channel=10), the length of the buffer configured to receive the attribute in the main controller is assumed to be 2 k, and the length of the attribute to be reported by the node is assumed to be 900.

1. The main controller transmits the attribute request frame to the node, and the value of each field is configured to be as: M1M0EM0=100, channel=10, CMD=0XFE, D1~D4=2K.

2. The node transmits the first block data inputting frame to the main controller, and the value of each field is configured to be as: M1M0EM0=111, channel=10, END=0, I=0, D0~D7 is configured to be the first 8 bits of the attribute data of the node.

3. The node transmits the n-th block, data inputting frame to the main controller, and the value of each field is configured to be as: M1M0EM0=111, channel=10, END=0, 1=n−1, D0~D7 is configured to be the nth 8 bite of the attribute data of the node.

4. The node transmits the (n+1)-th block data inputting frame to the main controller, and the value of each field is configured to be as: M1M0EM0=111, channel=10, END=1, 1=n, D0~D7 is configured to be the last (n+1)-th packet 8 of the attribute data of the node.

5. The node transmits the block instruction attribute request response frame, and the value of each field is configured to be as: M1M0EM0=110, channel=10, CMD=0XFD, D1~D4=900.

In another aspect, the present disclosure further relates to a data transmission device. The frame structure of the embodiment is the same with the above, and may not be described again.

Figure 5:
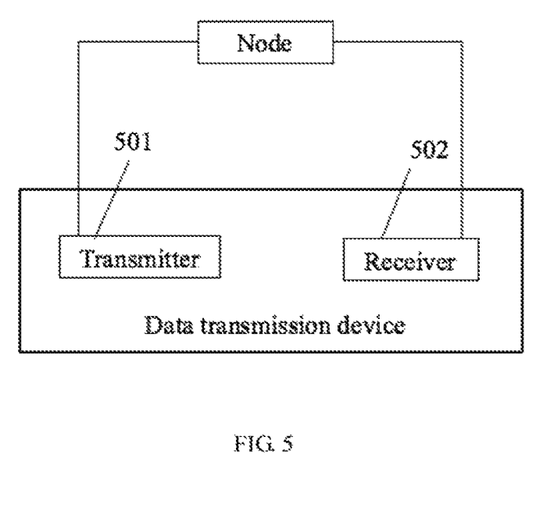
FIG. 5 is a schematic view of a data transmission device for robot in accordance with one embodiment of the present disclosure.

The data transmission device for robot, as shown in FIG. 5, may include a transmitter 501 and a receiver 502.

The transmitter 501 is configured to transmit the attribute reporting request to the node, wherein the attribute reporting request carries the length of the buffer configured to store the attribute data.

The receiver 502 is configured to receive the attribute data reported from the node and to receive the attribute reporting response transmitted from the node.

Wherein the length of the attribute data is less than or equals to the length of the buffer.

The present disclosure relates to the data transmission device for robot, wherein the main controller may receive the attribute data transmitted from the node. The main controller may inform the length of the buffer for storing the attribute data, while requesting the node to report the attribute data. As such, the node is aware of the length of the buffer, so as to enhance the reliability.

Figure 6:
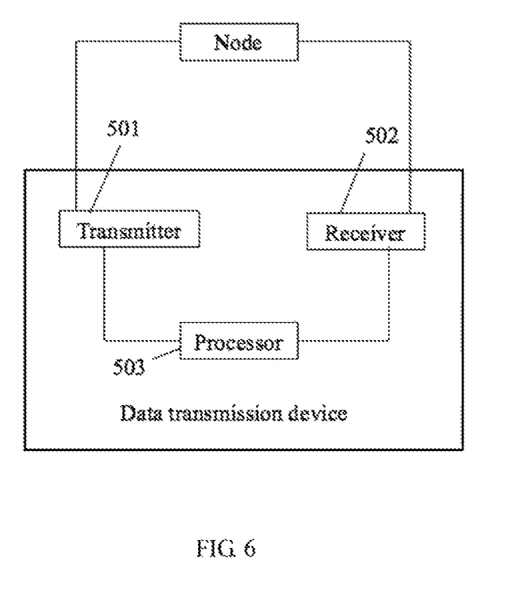
FIG. 6 is a schematic view of a data transmission device for robot in accordance with one embodiment of the present disclosure.

The data transmission device for robot, as shown in FIG. 6, may include the transmitter 501, the receiver 502 and a processor 503.

The transmitter 501 and the receiver 502 shown in FIG. 6 may have the same function in a portion with the transmitter 501 and the receiver 502 shown in FIG. 5.

In one example, the receiver 502 may be further configured to receive the attribute reporting response transmitted from the node before received attribute date reported from the node, wherein the attribute reporting response carries the length of the attribute data to be reported. The processor 503 is configured to update the buffer according to the length of the attribute data reported from the node and is configured to drive the transmitter to transmit the attribute reporting request to the node.

In one example, the receiver 502 may be further configured to receive the at least one block data transmitted from the node, wherein each of the block data carries the data block identification and the indicator bit indicating the end of the attribute reporting process by the node.

The main controller may receive the attribute reporting response. If the main controller determines the length of the received attribute is greater than or is less than the length carried by the attribute reporting response, the main controller may request the node to re-transmit the attribute. That is, the processor 503 is further configured to drive the transmitter 501 to transmit the attribute reporting request to the node upon determining the length of the received attribute data is greater than or less than the length earned by the attribute reporting response.

Figure 7:
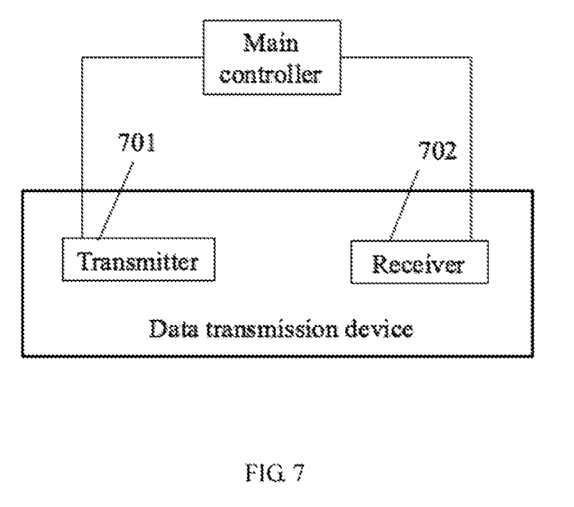
FIG. 7 is a schematic view of a data transmission device for robot in accordance with one embodiment of the present disclosure.

In one example, as shown in FIG. 7, the data transmission device may be adopted by the node, and may include the transmitter 701 and the receiver 702.

The receiver 702 is configured to receive the attribute reporting request from the main controller, wherein the attribute reporting request, carries the length of the buffer configured to store the attribute data.

The transmitter 701 is configured to transmit the attribute data to the main controller and to transmit an attribute reporting response to the main controller.

Wherein the length of the attribute data is less than or equals to the length of the buffer.

The present disclosure relates to the data transmission device for robot, wherein the node may receive the attribute reporting request transmitted from the main controller. The main controller may inform the length of the buffer for storing the attribute data, while requesting the node to report the attribute data. As such, the node is aware of the length of the buffer, so as to enhance the reliability.

Figure 8:
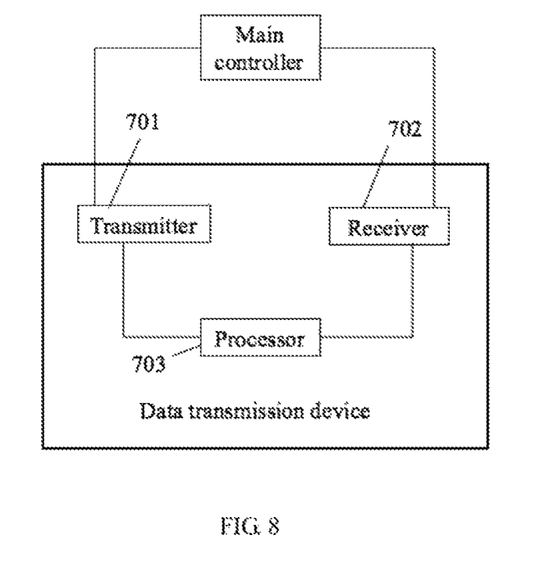
FIG. 8 is a schematic view of a data transmission device for robot in accordance with one embodiment of the present disclosure.

In one example, as shown in FIG. 8, the data transmission device may be adopted by the node, and may include the transmitter 701, the receiver 702 and the processor 703.

The transmitter 701 and the receiver 702 shown in FIG. 8 may have the same function in a portion with the transmitter 701 and the receiver 702 shown in FIG. 7.

In one example, the processor 703 may be further configured to determine whether the length of the attribute data to be reported is greater than the length of the buffer, to drive the transmitter 701 to transmit the attribute reporting response to the node upon determining the length of the attribute data to be reported is greater than the length of the buffer, wherein the attribute reporting response carries the length of the attribute data to be reported, and the length of the attribute data to be reported drives the main controller to update the buffer. The processor 703 may be further configured to drive the transmitter 701 to transmit the attribute data to the main controller upon determining the length of the attribute data to be reported is less than or equals to the length of the buffer.

In one example, the transmitter 701 may be further configured to transmit the at least one block data to the main controller, wherein each of the block data carries the data block identification and the indicator bit indicating the end of the attribute reporting process by the node.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A data transmission method for robot, comprising:
   transmitting, by a main controller, an attribute reporting request to at least one node via an attribute request frame, wherein the attribute request frame is an extended data frame and the attribute reporting request carries a length of a buffer configured to store attribute data, and the attribute data is in form of block data;
   determining, by the node, whether a length of attribute data to be reported is greater than the length of the buffer, transmitting a first attribute reporting response to the main controller in response to the length of the attribute data to be reported being greater than the length of the buffer, and transmitting the attribute data in response to the length of the attribute data to be reported being not greater than the length of the buffer, wherein the first attribute reporting response carries the length of the attribute data to be reported; and
   receiving, by the main controller, the first attribute reporting response transmitted from the node, updating the length of the buffer according to the first attribute reporting response, and returning step of transmitting the attribute reporting request to the at least one node via the attribute request frame.

2. The data transmission method for robot according to claim 1, wherein the method further comprises:
   receiving, by the main controller, a second attribute reporting response transmitted from the node after receiving the attribute data, wherein the second attribute reporting response is configured to indicate the attribute data being completely transmitted.

3. The data transmission method for robot according to claim 2, wherein the extended data frame comprises an arbitration field, the arbitration field comprises an identity sub-field, and the identity sub-field comprises:
   a frame-mode indication sub-field configured to indicate a frame analytical method wherein the frame-mode indication sub-field comprises 3 bits comprising M1, M0, and EM0, and values of M1, M0, and EM0 comprise 0 or 1;
   a channel identification field configured to indicate the channel between the main controller and the node, wherein the channel identification field comprises 16 bits illustrating by CH15 to CH0, a value of the channel identification field is in a range from 0 to 65535, and a zero value indicates a broadcast channel; and
   a flag field comprises 10 bits comprising N, END, and I, wherein N indicates a reserved bit, END is configured to indicate the last frame, a value of END is 0 or 1, and I is a self-increasing cycle code configured to indicate a sending serial number of the frame.

4. The data transmission method for robot according to claim 3, wherein the block data is transmitted via the block data inputting frame, and the block data inputting frame is of the extended data frame format.

5. The data transmission method for robot according to claim 3, wherein the attribute reporting request is transmitted via a channel between the main controller and the node, and the channel is assigned by the main controller; and
   wherein step of determining, by the node, whether the length of the attribute data to be reported is greater than the length of the buffer, comprises:
   determining, by the node, whether the attribute reporting request is transmitted via the broadcast channel, and determining whether the length of the attribute data to be reported is greater than the length of the buffer, in response to the attribute reporting request being not transmitted via the broadcast channel.

6. The data transmission method for robot according to claim 3, wherein the first attribute reporting response and the second attribute reporting response received via a block instruction attribute request response frame, and the block instruction attribute request response frame adopts the extended data frame.

7. The data transmission method for robot according to claim 4, wherein the receiving step further comprises:
   receiving at least one block inputting data transmitted from the node, and the flag field of the block data inputting frame indicating that the attribute data of the node have been completely transmitted.

8. The data transmission method for robot according to claim 6, wherein the first attribute reporting response and the second attribute reporting response are transmitted via a channel between the main controller and the node, and the channel is assigned by the main controller; and
   wherein step of updating the length of the buffer according to the first attribute reporting response, comprises:
   determining, by main controller, whether the first attribute reporting response is transmitted via the broadcast channel, and updating the length of the buffer according to the first attribute reporting response, in response to the first attribute reporting response being not transmitted via the broadcast channel; and
   wherein after step of receiving, by the main controller, the second attribute reporting response transmitted from the node after receiving the attribute data, the method further comprises:
   ignoring, by the main controller, the second attribute reporting response, in response to the second attribute reporting response being transmitted via the broadcast channel.

9. The data transmission method for robot according to claim 7, wherein the extended data frame format further comprises a data field, the data field comprises a CMD field of 1 bit and a field of 7 bits, the CMD field is configured to indicate a secondary instruction corresponding to different analytical methods of the extended data frame, and the field is configured to indicate the data carried by the secondary instruction.

10. The data transmission method for robot according to claim 4, wherein the attribute data adopts an ini configuration file format, the ini configuration file format comprises a constant portion and a variable portion, and the attribute data are transformed into a data format carried by the block data inputting frame via coding.

11. The data transmission method for robot according to claim 9, wherein the data field of the block data inputting frame comprises 8 bits which are configured to carry the data.

12. A data transmission device for robot, comprising:
a transmitter configured to transmit an attribute reporting request to at least one node via an attribute request frame, wherein the attribute request frame is an extended data frame, and the attribute reporting request carries a length of a buffer configured to store attribute data, and the attribute data is in form of block data;
a receiver configured to:
receive a first attribute reporting response transmitted from the node, update the length of the buffer according to the first attribute reporting response, wherein the node determines whether a length of attribute data to be reported is greater than the length of the buffer, transmits the first attribute reporting response to the data transmission device in response to the length of the attribute data to be reported being greater than the length of the buffer, and the first attribute reporting response carries the length of the attribute data to be reported;
receive the attribute data reported from the node wherein the node transmits the attribute data to the data transmission device in response to the length of the attribute data to be reported being not greater than the length of the buffer.

13. The data transmission device for robot according to claim 12, wherein the receiver is further configured to:
receive a second attribute reporting response transmitted from the node after receiving the attribute data, wherein the second attribute reporting response is configured to indicate the attribute data being completely transmitted.

14. The data transmission device for robot according to claim 13, wherein the extended data frame comprises an arbitration field, the arbitration field comprises an identity sub-field, and the identity sub-field comprises:
a frame-mode indication sub-field configured to indicate a frame analytical method, wherein the frame-mode indication sub-field comprises 3 bits comprising M1, M0, and EM0, and values of M1, M0, and EM0 comprise 0 or 1;
a channel identification field configured to indicate the channel between the main controller and the node, wherein the channel identification field comprises 16 bits illustrating by CH15 to CH0, a value of the channel identification field is in a range from 0 to 65535, and a zero value indicates a broadcast channel; and
a flag field comprises 10 bits comprising N, END, and I, wherein N indicates a reserved bit, END is configured to indicate the last frame, a value of END is 0 or 1, and I is a self-increasing cycle code configured to indicate a sending serial number of the frame.

15. The data transmission device for robot according to claim 14, wherein the block data is transmitted via the block data inputting frame, and the block data inputting frame is of the extended data frame format.

16. The data transmission device for robot according to claim 15, wherein the receiver is further configured to receive at least one block data inputting frame transmitted from the node, and the flag field of the block data inputting frame indicating that the attribute data of the node have been completely transmitted.

17. A data transmission device for robot, comprising:
a processor;
a receiver configured to receive an attribute reporting request from a main controller, wherein the attribute reporting request is transmitted via an attribute request frame, the attribute request frame is an extended data frame, and the attribute reporting request carries a length of a buffer configured to store attribute data;
a transmitter configured to:
transmit a first attribute reporting response to the main controller, in response to the processor the processor determining that a length of at least one attribute data to be reported is greater than the length of the buffer, wherein the first attribute reporting response carries the length of the attribute data to be reported;
transmit the attribute data to the main controller via at least one block data, in response to the processor determining that the length of the attribute data to be reported is less than or equals to the length of the buffer.

18. The data transmission device for robot according to claim 17, wherein the transmitter is further configured to:
transmit a second attribute reporting response after the attribute data have been completely transmitted, wherein the second attribute reporting response is configured to indicate the attribute data being completely transmitted.

19. The data transmission device for robot according to claim 18, wherein the extended data frame comprises an arbitration field, the arbitration field comprises an identity sub-field, and the identity sub-field comprises:
a frame-mode indication sub-field configured to indicate a frame analytical method, wherein the frame-mode indication sub-field comprises 3 bits comprising M1, M0, and EM0, and values of M1, M0, and EM0 comprise 0 or 1;
a channel identification field configured to indicate the channel between the main controller and the node, wherein the channel identification field comprises 16 bits illustrating by CH15 to CH0, a value of the channel identification field is in a range from 0 to 65535, and a zero value indicates a broadcast channel; and
a flag field comprises 10 bits comprising N, END, and I, wherein N indicates a reserved bit, END is configured to indicate the last frame, a value of END is 0 or 1, and I is a self-increasing cycle code configured to indicate a sending serial number of the frame.

20. The data transmission device for robot according to claim 19, wherein the block data is transmitted via the block data inputting frame, and the block data inputting frame is of the extended data frame format, and the flag field of the block data inputting frame indicating that the attribute data of the node have been completely transmitted.

* * * * *